United States Patent [19]

O'Hare

[11] 4,309,148
[45] Jan. 5, 1982

[54] PULSING STEAM SOLAR WATER PUMP

[76] Inventor: Louis R. O'Hare, 1700 Banyan #2, Fort Collins, Colo. 80526

[21] Appl. No.: 101,218

[22] Filed: Dec. 7, 1979

[51] Int. Cl.³ .................. F04B 49/00; F04B 19/24
[52] U.S. Cl. ................................ 417/18; 417/32; 417/36; 417/209; 417/379
[58] Field of Search .................. 417/18, 32, 36, 118, 417/207, 208, 209, 379; 60/641 C, 641 A, 641 AB, 641 AD, 641 AC, 641 AE

[56] References Cited

U.S. PATENT DOCUMENTS

| | | | |
|---|---|---|---|
| 1,481,460 | 1/1924 | Doble | 60/667 |
| 2,153,117 | 4/1939 | Goff et al. | 417/36 X |
| 2,874,716 | 2/1959 | Conchon | 417/36 |
| 2,969,637 | 1/1961 | Rowekamp | 60/641 A |
| 2,975,347 | 3/1961 | Schaefer | 417/36 X |
| 3,995,429 | 12/1976 | Peters | 60/641 A |

FOREIGN PATENT DOCUMENTS 708113  7/1931  France .................. 417/209

Primary Examiner—Leonard E. Smith

[57] ABSTRACT

In this solar steam driven water pump steam is periodically generated and then condensed within a cavity to produce first a period of pressure over a column of water and then a period of vacuum to thereby first expell water from the cavity through one check valve and to subsequently fill the cavity with water through another check valve at the time of the vacuum, the generation of said steam pressure within said cavity being effected by a separate small pump within the cavity when this pump moves a small quantity of water in the cavity to a solar heated chamber in the cavity and the subsequent effecting of the vacuum within said cavity being accomplished when the water pumping chamber is cooled by condensation of the steam on the column of water against which it is acting, the periodic cessation of the small pump causing steam generation to cease when thermostats contacted by hot steam as water is expelled from the water chamber open a circuit stopping the small pump.

9 Claims, 10 Drawing Figures

PULSING STEAM SOLAR WATER PUMP

This invention is a solar powered water pump that uses solar heated steam to drive a volume of water from a chamber and out a water line. It uses the vacuum produced in a chamber when steam condenses to pull water into the chamber, i.e. ambeint pressure moves water into the chamber when a vacuum has been produced there by condensed steam. This present pump differs from previous steam pumps that operated on this principle in the way steam is formed above the water column that the steam is to move. That is to say this pump differs from previous pumps of a similar nature by the way in which the intermittant surges of steam are produced and metered to the chamber for driving the water from the chamber. The former art uses valves in one instance to admit steam from a boiler into the chamber to drive out the water. In another instance light energy was cycled directly into the water in the pumping chamber to heat intensely a small portion of water, converting it to steam to drive the remaining still cool water from the chamber. Subsequently, the light was diverted from the chamber to provide cooling of the steam, condensation and the necessary vacuum. Accordingly, while the use of surges of steam was not novel in some cases, nevertheless the way in which these surges were produced provided novel aspects to various different steam pumps. Then novelty of the present invention consists in a different way of producing the steam surges and the utility of this means makes it particularly adaptable and advantageous as a unique way of converting the heat from a solar consentrator to useful steam energy for water pumping. While solar heat is heat like any other heat, it does have pecularities that must be considered if it is to be used efficiently. Since it is not always present and is present only sporatically during periods of intermittant overcast, then as much of it as possible on a given area should be used as quickly as possible to make use of the highest temperature difference possible and to prevent heat loss during stored periods. This invention then generates steam and provides pumping work in as short a time as possible from incident solar energy. It does away with the conventional requirement of a cumbersome steam boiler and the requirement to average-out all temperature inputs over a period of time until at last all of the water stored in the boiler is brought to a boil. (On a partially overcast day because because of temperature averaging the water may never boil.)

Accordingly, the novelty of my present invention consists in a different and more efficient means of producing steam surges rapidly when incident solar is available with as little waiting period as possible for the temperature rise to the boiling point by heating as little water to steam as possible and pumping with it as quickly. Another object and novelty of this invention is to move the water to the steam generating area as efficiently and as simply as possible. In former art either high pressure pumps would have to act against the pressure of boiler steam to force water in to fill an operating boiler or elaborate valving were required to admit water during operation, but in this invention repeatedly and continuously small quantities of water are taken and converted to surges of steam because the water that is so moved for conversion to steam is taken from within a steam pressurized cavity and the pump that moves it need not operate against the pressure of the cavity since the pump is itself within the cavity and merely moves the water to a hoter part of the cavity. Another object of this invention is to obviate the clean water requirement of conventional steam boiler systems. This requirement is present in most steam systems because steam along leaves the boiling area. Salts and particulates do not evaporate but remain in the boiler to impede its operation. Whereas in this invention since both steam and water constantly rinse the steam generating chamber there is no clean water requirement.

Other objects and advantages will be apparent in the following embodiments described in the drawings.

FIG. 1 of the drawings illustrates a highly pressurized chamber having water and an air space with a pump in the water capable of spraying water into the air space with but little energy.

FIG. 2 of the drawings illustrates an extension of the principle of FIG. 1 by depicting an irregular pressurized cavity into the irregularities of which cavity a sealed pump is able to pump water with very little energy.

Figure 1:
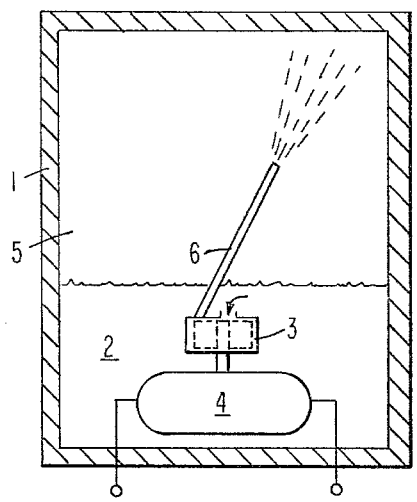

Referring then to FIG. 1 of the drawings, highly pressurized chamber 1 is partially filled with water 2 in which is submerged a submersible pump 3 and motor 4. This drawing illustrates the principle that pump 3 is capable of spraying water into pressurized air 5, the pump requiring only a small amount of energy to do this since the pump does not pump against the pressure in the chamber as the pump's inlet and outlet ports are both at approximately the pressure of the chamber. Pump 3 need only produce a slight pressure differential within the highly pressurized chamber in order to elevate the water column in line 6.

Figure 2:
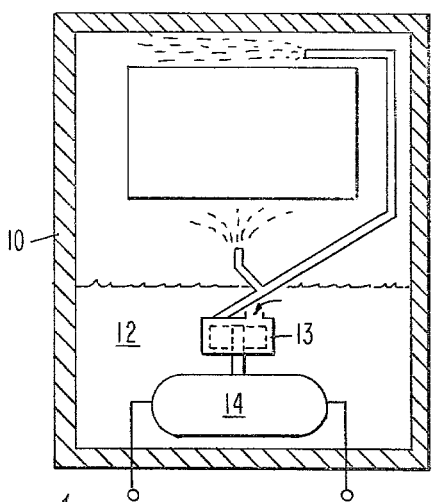

Referring then to FIG. 2 of the drawings, the pressurized but irregular cavity of chamber 10 takes the place of chamber 1 in FIG. 1 to illustrate that pump 13 with motor 14 is capable of lifting water 12 and of spraying it into irregular areas of the cavity with but a small energy requirement since the pump 13 itself is within the cavity and is not operating against the high pressure of the chamber.

Figure 3:
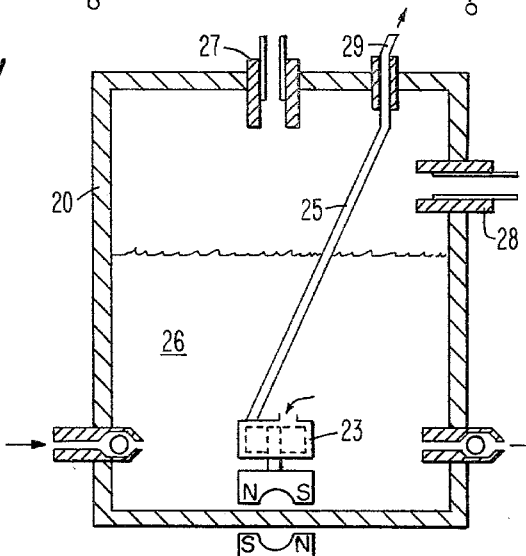
FIG. 3 illustrates a way in which a pump is sealed in a chamber and operated within that sealed chamber when that chamber is part of a pressurized cavity.

Referring then to FIG. 3, the motor 24 is outside of the chamber 20 while the pump 23 is driven inside chamber 20 by means of magnetic coupling with magnets 17 and 18. The result is that any pumping by 23 done within the cavity of chamber 20 and any other chamber of that cavity that may be attached with seals 27, 28 and 29 is not accomplished against the pressure that may be present within the cavity since both the inlet and outlet ports of the pump 23 are at approximately the same pressure that is present throughout the entire cavity. The water 26 is pumped up line 25 and eventually to a steam generating chamber shown in a later figure. The steam generating chamber will be seen to be so connected and sealed to this chamber that it is merely an extension of the same cavity.

Figure 4:
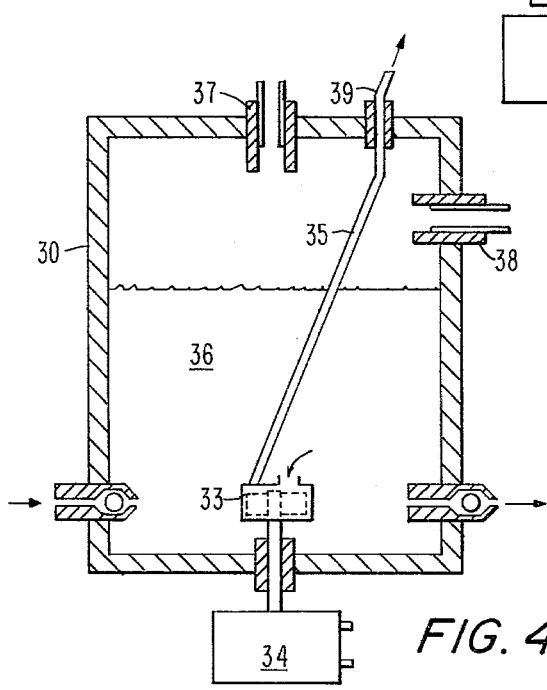
FIG. 4 shows an alternate way of operating a pump sealed in a pressurized chamber.

Referring then to FIG. 4 of the drawings, motor 34 is outside the chamber 30 while the pump 33 is driven inside of 30 so that the pump's pressure operates only against the water column it is pumping up pipe 35 and not against whatever high ambient may be present in the cavity of which chamber 30 is part. Seals 37, 38 and 39 show that the cavity of which 30 is a part is continued with another chamber to be shown in FIG. 6. Water in chamber 30 by 36.

Figure 5:
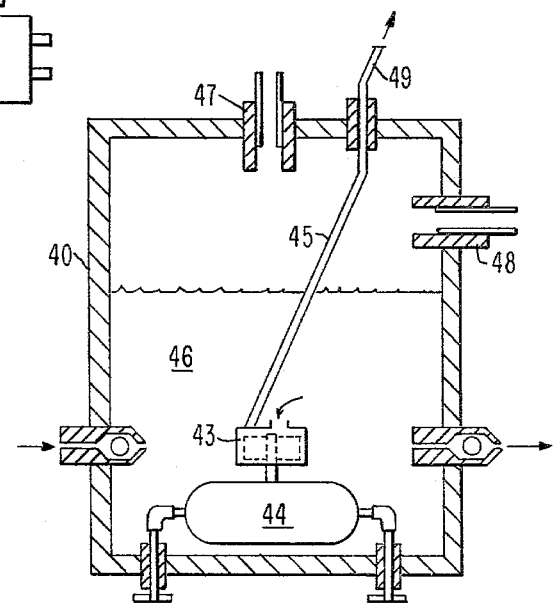
FIG. 5 illustrates a pump and its sealed motor which can provide a small pressure differential across said pump even though the ambient pressure all around the pump is very high in a pressurized system.

Referring then to FIG. 5 of the drawings, both motor 44 and pump 43 are inside the cavity 40 to pump water 46 up line 45 to another chamber sealed within the same cavity by seal and coupling 47,48 and 49 so that the pump's work is done within the pressure ambient of the cavity and not against it. Water is shown by 46.

Figure 6:
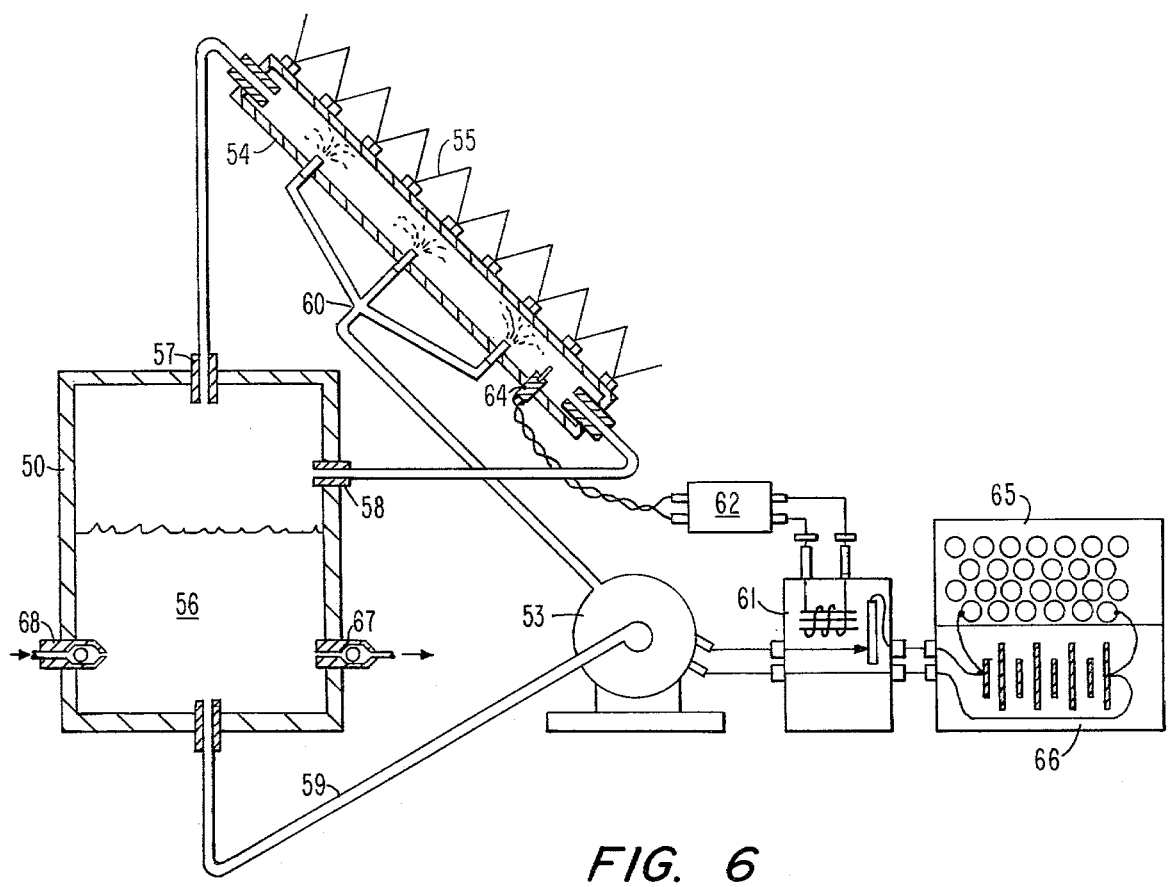
FIG. 6 shows a complex cavity formed of the many elements of the solar steam pump throughout which cavity the pressures are equal except for the slight pressure differential across the small pump which slight pressure differential is used to pump water onto the hot consentrator walls. Switching elements and solar electric power source are also shown.

Referring now to FIG. 6, a diagramatic drawing depicting the solar steam pump with its essential components is shown. The periodically steam pressurized cavity is shown consisting of water pumping chamber 50, of small centrifugal pump 53, of steam generating chamber 54, and of interconnecting ducts with seals 57,58,59 and 60. Water in the cavity is shown by 56. Solar energy incident on collector consentrator 55 heats steam generating chamber 54 to a steam generating temperature sensed by temperature probe 64 which activates relay 61 through amplifier 62. Relay 61 activates small centrifugal pump with motor 53 which receives water 56 through duct 59 and pumps it onto walls of 54 through branched duct 60. The solar cell panel 65 provides electrical energy to maintain a charge on battery 66 and to provide the energy to operate the small centrifugal pump motor of pump 53. When the water from 53 impinges the walls of 54 steam is produced and the pressure from its confinement within the cavity is transmitted through ducts 57 and 58 to exert force on water column 56, thereby driving water through check valve 67 for any appropriate use downstream of 67. As water from 53 cools chamber 54 to a slightly lower degree probe 64 acts through 61 and 62 to stop pump 53 and steam condensing over water 56 produces a vacuum to draw water through inlet check valve 68 and to replenish column 56. Water in 54 not converted to steam during the period 54 was cooled to a slightly lower degree returns to column 56 via duct 58. Steam chamber 54 reheats again and the cycle repeats as higher temperatures are reached. Finally it should be noted with regard to this FIG. 6 that the small centrifugal pump 53 and its connecting ducts 59 and 60 are integral to the pressurized cavity. That is to say that the pressure inside the small pump 53 and at its inlet and exit ports is the same as the pressure within the rest of the system at any given moment except for the relatively small pressure differential caused by the operation of the small pump itself. That small pressure differential from the small pump 53 is just enough to lift a water column and spray water within chamber 54. The walls and seals of 53 must be sturdy enough to sustain the the steam pressure of the system but the output pressure of the pump itself need only be a few p.s.i. to move the water column as high as the top of the steam generating chamber. Further, the centrifugal impeller that is inside this pump's working chamber may be driven by a sealed shaft through the wall of this pump or it may be magnetically driven as a conventional magnetically coupled, seal-less pump is driven, i.e. with a magnet inside the pump's wall being rotated by an opposed, motor-rotated magnet outside the pump's wall.

The water pumping chamber 50 of FIG. 6 together with the small centrifugal pump 53 of FIG. 6 with its fittings may both be exchanged for the water chamber and small pump combinations of any of the three preceding figures. Chamber 20 of FIG. 3, for instance, with its internal small pump may be used in place of chamber 50 in FIG. 6 and 23 of FIG. 3 will take the place of 53 of FIG. 6. Seals 27 and 28 will then connect 20 of FIG. 3 to steam generating chamber 54 of FIG. 6 in place of seals 57 and 58, and 29 of FIG. 3 will carry water to 54 of FIG. 6 in place of 60 of FIG. 6. Similarly, chamber 30 with motor 34 and pump 33 with fittings 37, 38 and 39 of FIG. 4 may be used instead of chamber 50, pump 53 and fittings 57,58 and 60 of FIG. 6. Corresponding substitutions may be made from the components of FIG. 5 for their counterpart components of FIG. 6. Thereby chamber 40 can replace chamber 50. Pump and motor 33 and 34 replace 53. Line and seal 35 and 39 replace 60. Throughout the figures from FIG. 3 to FIG. 6 the small pump that operates within the pressurized cavity and is designated by various numbers such as 23,33,43 and 53 specifies the unique character of this inventive concept because it can provide a large and very energetic pumping system with controlling energy while this little pump itself is very simple and requires very little energy. The energy to excite it can come from a small bank of solar cells as in the embodiment noted in FIG. 6 of it can come from other sources such as a small hand crank to be used in places where electric motors and solar cells are less readily available. This small pump is designated as a centrifugal pump because a centrifugal pump has the advantage of minimum wear when used in dirty water but this designation is not meant to limit the inventive concept only to the use of a centrifugal pump in that position. Other types of pumps may be used in the same placement relative to the other components of the invention. Other such pumps to be so used are gerotor pumps, rotary vane pumps, gear pumps and the like.

Figure 7:
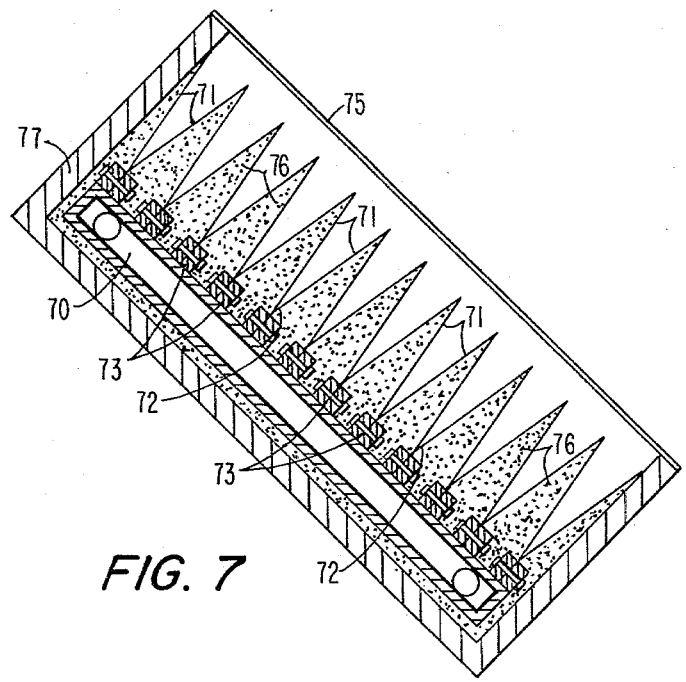
FIG. 7 shows a cross sectional view of a consentrating collector used to heat a steam generating chamber.

A solar energy consentrating collector is shown in FIG. 7 and immediately behind the collector and attached to it to absorb heat from it is a steam generating chamber 70. Reflecting surfaces 71 converge incident solar radiation to apexes 72 for the purpose of temperature elevation at these apexes. Each pair of the reflecting surfaces forms a very narrow angle of about 15 degrees of less at the apex making it very difficult for radiant energy to be reflected back to the direction from which it came. Heat sinks 73 supporting the reflective surfaces at their apexes conduct the heat generated there to the steam generating chamber 70 in which water is converted to steam as described in FIG. 6. To prevent heat loss by convection a glass or plastic transparent cover 75 is placed over the collector in the customary manner and insulation 76 is placed on the dark side of each reflecting plate and around the steam generating chamber. Box 77 supports and houses the reflecting surfaces 71, steam generating chamber 70 heat sinks 73 and insulation 76 as well as the glass cover 75.

Figure 8:
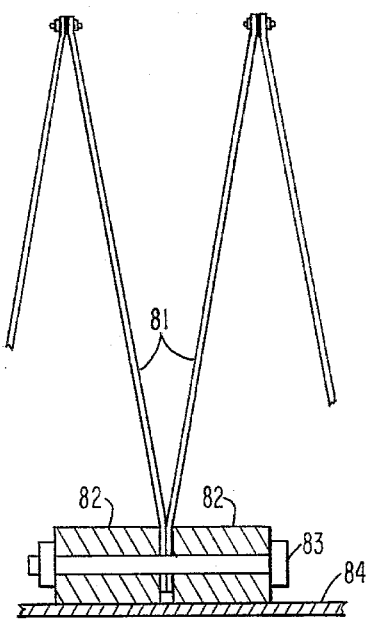
FIG. 8 shows a consentrating collector element capable of converging and consentrating solar light energy by directing repeated reflections to a central point to provide a high temperature.

Then the FIG. 8 shows how an individual set of reflecting surfaces 81 are supported by heat sinks 82 and bolt 83. The heat sinks 82 are welded to steam generating chamber wall 84.

Figure 9:
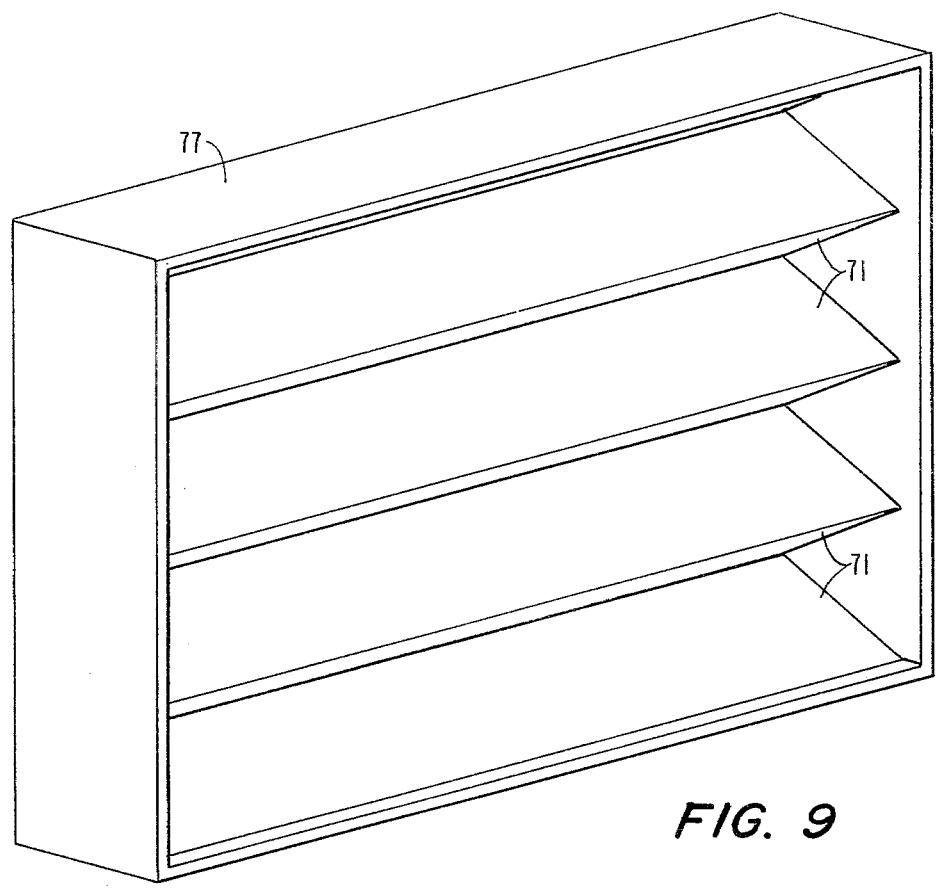
FIG. 9 shows a solar collector box in which are located an array of highly reflective elements described in FIG. 8.

Referring then to FIG. 9, the reflecting surfaces 71 are seen in a three dimensional view, enclosed in box 77.

Figure 10:
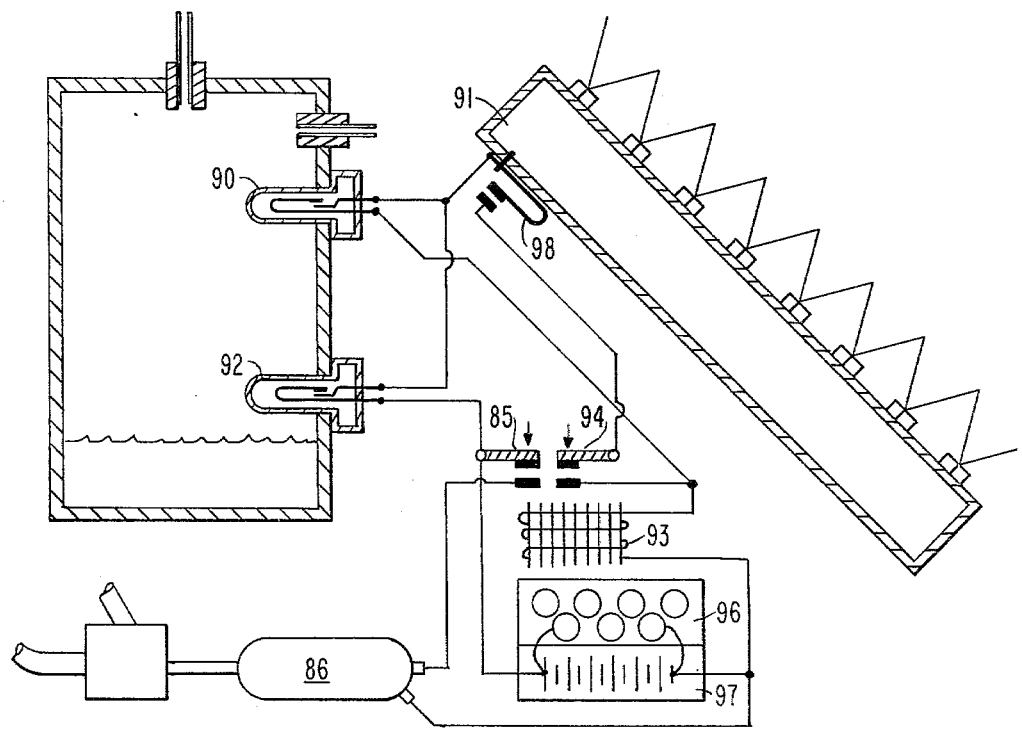
FIG. 10 shows thermostats capable of energizing the small pump when the temperature of the steam generator reaches adequate heat and of stopping the motor when the flow of water from the pump has filled the water pumping chamber.

Regarding FIG. 10, a thermostatic control system with three thermostats is shown. The upper thermostat 90, shown here as a bimetalic thermostat but representing any switching thermostat, has contacts which are open at steam temperature but closed when cooled in the water column. The thermostat is adjustable for most efficient operation. As solar energy heats steam generating chamber 91, first thermostat 98 closes and enables thermostat 90 to energize relay 93 when the temperature of 90 is cooled by the rising water column. Thermostat 92 is set to close its contacts when cooled by the rising column of water and to open them at the higher temperature of steam. Consequently, when the collector and steam generating chamber are heated to temperature and the water pumping chamber 99 is filled, then all thermostats 90, 98 and 92 have their contacts closed. Thermostat 98 closed by being heated, and 90 and 92 by being cooled. Thermostat 90 latches relay 93, i.e. it energizes the coil of 93 closing contacts 94 which continue to supply current to 93, to its coil, as long as 92 and 98 are closed. With coil 93 energized, contacts 85 are also closed and the small internal water circulating pump 86 is engaged thereby pumping water to the steam generating chamber as described in FIG. 6. When steam enters the water pumping chamber and the water is expelled 90 is exposed to the temp of hot steam and its contacts open but small pump 86 continues to operate and steam continues to be generated because 93 is still energized by closed points 94, closed points 92 and 98 keeping points 85 closed and 86 operating. But when finally sufficient water is expelled to expose points 92 and they are heated by steam and opened, the circuit delivering current from battery 97 and collector 96 is opened and 86 stops pumping. Steam then condenses over the water column 99 producing a vacuum to again raise the water level as previously described. The points of 92 will close first as the water rises but the small pump 86 will not operate until points 90 are closed and relay 93 is again engaged. Should steam generator 91 drop below generating temperature during this process, thermostat 98 will open its contacts and thereby open the circuit by deenergizing relay 93 opening 85 and stoping the small pump. Whenever 91 is again at steam temperature the total operation will again continue.

Solid state circuitry using thermocouples or temperature sensitive resistors along with bistable multivibrators with multiple inputs can be adapted according to the present state of the art to replace the thermostat relay combination given above thereby to provide another embodiment of the basic inventive concept. Conventional solar consentrators, parabolic reflectors and parapolic troughs as well as lenses are used in place of the the consentrator herein described providing other embodiments of the concept. In still other embodiments conventional fuels such as wood, coal, oil or other hydrocarbons are used to heat the steam generating chamber, similarily geothermal energy may also be employed immersing the steam chamber in a geothermal heat source.

I claim:

1. A solar heated, steam driven water pump comprising:

An alternating steam pressurization and vacuum production means comprising a portion of a cavity which portion being capable of being strongly heated and then cooled in such a manner that during the heated period this heated part of the cavity is able firstly to receive a flow of water from another part of the same cavity, the pressure for said water delivery from one to the other part of said cavity being a low pressure relative to the absolute pressures periodically produced within the cavity, and secondly to convert the water to steam pressure because of the enclosure of the cavity and during the cooled period that same part of the cavity is able to provide a vacuum by condensation of the steam produced during the former heated period and, Steam generating chamber heating means and, Low pressure periodic water circulating means consisting of water receiving and water impelling means in the form of a chamber that is another part of the same cavity used for pressurization and vacuum formation, said receiving and impelling means being a chamber capable of alternately receiving water from a source through a check valve under the influence of a vacuum within the cavity and said cavity being capable of expelling subsequently that water through another check valve during a steam generation period when steam acts to place pressure on the water and, Internal water circulation means in the form of a pump within the cavity by which means a small quantity of that water received into the cavity is moved to the steam generation chamber, Internal water circulation control means by which the intermittent flow of the internal water circulation means is first initiated when steam generating temperature is reached in the steam generating chamber and is interrupted when the temperature lowers to the point of condensation.

2. A solar heated, steam driven water pump comprising:

An alternating steam pressurization and vacuum production means comprising a portion of a cavity which portion being capable of being strongly heated and then cooled in such a manner that during the heated period this heated part of the cavity is able firstly to receive a flow of water from another part of the same cavity, the pressure for said water delivery from one to the other part of said cavity being a low pressure relative to the absolute pressures periodically produced within the cavity, and secondly to convert the water to steam pressure because of the enclosure of the cavity and during the cooled period that same part of the cavity is able to provide a vacuum by condensation of the steam produced during the former heated period and, Steam generating chamber heating means and, Low pressure periodic water circulating means consisting of water receiving and water impelling means in the form of a chamber that is another part of the same cavity used for pressurization and vacuum formation, said receiving and impelling means being a chamber capable of alternately receiving water from a source through a check valve under the influence of a vacuum within the cavity and said cavity being capable of expelling subsequently that water through another check valve during a steam generation period when steam acts to place pressure on the water and, Internal water circulation means in the form of a pump within the cavity by which means a small quantity of that water received into the cavity is moved to the steam generation chamber, Internal water circulation control means by which intermittent flow of internal water is initiated when steam generating temperature is reached in the steam generating chamber and the water receiving means is filled and is interrupted when steam has driven water from the water receiving means.

3. A water pump as in claim 1 in which the steam generating chamber heating means is a solar energy consentrating collector.

4. A water pump as in claim 1 in which the steam generating chamber heating means is a solar energy consentrating collector comprising an array of sets of highly reflective rectangular plates, each set having two plates which meet along one side of each and have their reflective surfaces opening one from the other to form a narrow angle between the two plates to converge solar radiant energy to their apex and the long adjacent sides of which rectangular plates meet at the apex are each supported at the apex by a heat sink in which they are mounted, the heat sinks in turn being mounted on the steam generating chamber, with the entire array of said plates and said chamber being mounted in a box with insulation surrounding each element on the inside of the box except the reflective surfaces which are open to incident radiation entering through one side of the box which side is constructed of transparent material.

5. A water pump as in claim 1 in which the internal circulation means is a small pump located within the main pumping cavity with this small pump's water inlet located below the water level of the water received into the cavity, this small pump being driven by a motor outside the cavity by means of magnetic coupling through the walls of the cavity.

6. A water pump as in claim 1 in which the internal water circulation means is a small pump located within the main cavity with this small pump's water inlet located below the water level of the water received into the cavity, this small pump being driven by a small motor outside the cavity by means of a sealed shaft extending through the cavity wall.

7. A water pump as in claim 1 in which the internal circulation means is a small pump the pumping chamber of which is within the cavity of the main pumping system by means of sealed ducting extending that cavity to the small pump's chamber thereby connecting the water receiving chamber to the small pump's inlet and the steam generating chamber to the small pump's outlet.

8. A water pump as in claim 1 in which the steam generator heating means is a geothermal heat source into which is inserted the steam generating chamber.

9. A water pump as in claim 1 in which the steam generator heating means is a boiler using conventional combusting fuels.

* * * * *